(12) United States Patent
Ekström

(10) Patent No.: US 6,298,776 B1
(45) Date of Patent: Oct. 9, 2001

(54) TURNING DEVICE FOR FOOD PROCESSING CUTTING MACHINES

(75) Inventor: Ulf Ekström, Täby (SE)

(73) Assignee: AB Hällde Maskiner, Kista (SE)

( * ) Notice: Subject to any disclaimer, the term of this patent is extended or adjusted under 35 U.S.C. 154(b) by 0 days.

(21) Appl. No.: 09/720,855

(22) PCT Filed: Jun. 23, 1999

(86) PCT No.: PCT/SE99/01138

§ 371 Date: Feb. 9, 2001

§ 102(e) Date: Feb. 9, 2001

(87) PCT Pub. No.: WO00/01288

PCT Pub. Date: Jan. 13, 2000

(30) Foreign Application Priority Data

Jul. 2, 1998 (SE) .................................................. 9802376

(51) Int. Cl.[7] ............................. A23L 1/00; A47J 43/046; A47J 43/06; A47J 43/07; A23N 1/00
(52) U.S. Cl. ............................. 99/509; 99/495; 99/510; 99/537; 241/92; 241/101.1; 241/199.12; 241/282.1; 366/306; 366/309; 366/312; 366/314
(58) Field of Search ............................. 99/492, 495, 509–513, 99/537, 538, 461, 623–631; 83/355, 356.3, 592, 326, 423, 932, 435.2; 366/302, 306–315, 317, 604, 331, 601, 297–301; 241/37.5, 92, 93, 261, 261.1, 261.3, 260.1, 273.2, 101.1, 101.2, 199.12, 282.1, 282.2; 416/204 R, 184, 199; 426/474; 222/410; D7/384, 412, 376

(56) References Cited

U.S. PATENT DOCUMENTS

| | | | |
|---|---|---|---|
| D. 421,545 | 3/2000 | Ekström | D7/412 |
| 2,858,117 | 10/1958 | Girton | 366/312 |
| 4,186,543 | * 2/1980 | Lyell | 83/356.2 X |
| 4,199,268 | 4/1980 | Parzych | 366/306 |
| 4,240,338 | * 12/1980 | McClean | 241/92 X |
| 4,471,915 | * 9/1984 | Levin et al. | 99/492 X |
| 4,517,888 | * 5/1985 | Gould | 366/314 X |
| 4,542,857 | * 9/1985 | Akasaka | 241/282.1 X |
| 4,648,720 | 3/1987 | Trocherie | 366/306 |
| 4,744,522 | * 5/1988 | Borgmann et al. | 241/92 |
| 4,921,175 | * 5/1990 | Okada et al. | 366/601 X |
| 5,156,084 | * 10/1992 | Lin | 99/509 X |
| 5,320,031 | * 6/1994 | Whitney | 99/495 X |
| 5,421,248 | * 6/1995 | Hsu | 99/512 |
| 5,433,144 | * 7/1995 | Lee | 99/513 X |
| 5,445,332 | * 8/1995 | Shimizu et al. | 241/37.5 |
| 5,454,299 | * 10/1995 | Gonneaud | 99/492 |

FOREIGN PATENT DOCUMENTS 502741    12/1995  (SE) .

* cited by examiner

Primary Examiner—Timothy F. Simone
(74) Attorney, Agent, or Firm—Alfred J. Mangels

(57) ABSTRACT

A turning device for food processors that include a rotatable cutter to cut foodstuffs to be processed. A stationary container is fitted with a lid, and a tubular member extends upwardly from the container bottom through which a driven shaft extends. The cutter is mounted on the shaft and includes a sleeve-like central part and radially-outwardly-extending cutting knives. The turning device includes at least a pair of strips that extend axially from a tubular holder that is adapted to fit over the central part of the cutter. In use, the turning device is disposed over the central part of the cutter with the holder positioned above the strips. The turning device extends longitudinally relative to the cutter to cover essentially the whole of the central part of the cutter above the position of the cutting knives, and it is stationary relative to the container during operation of the food processor.

8 Claims, 3 Drawing Sheets

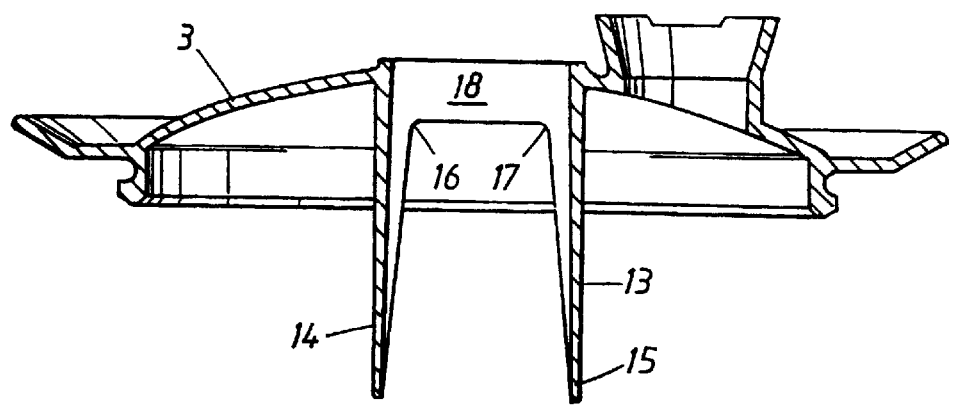
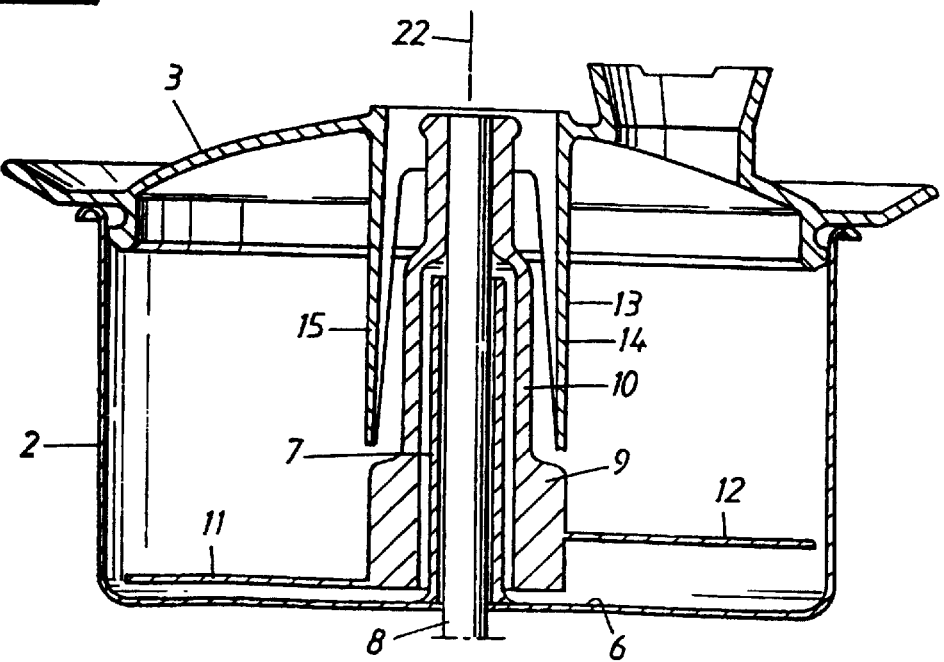

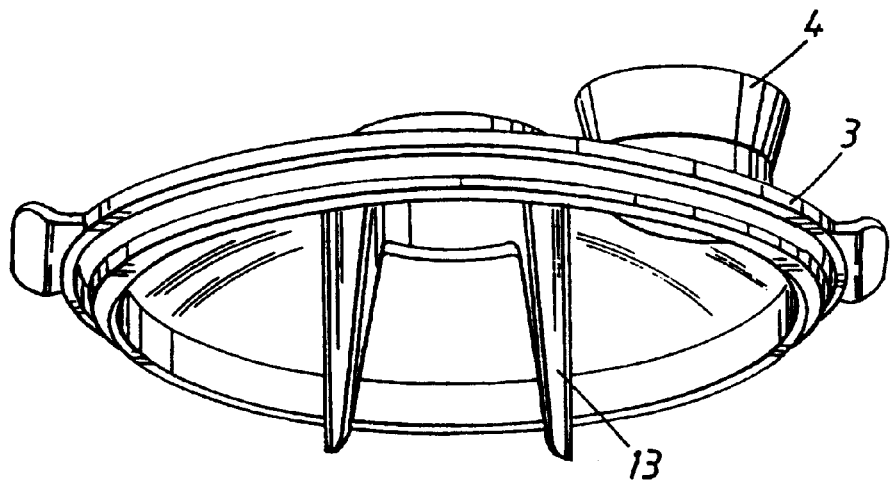
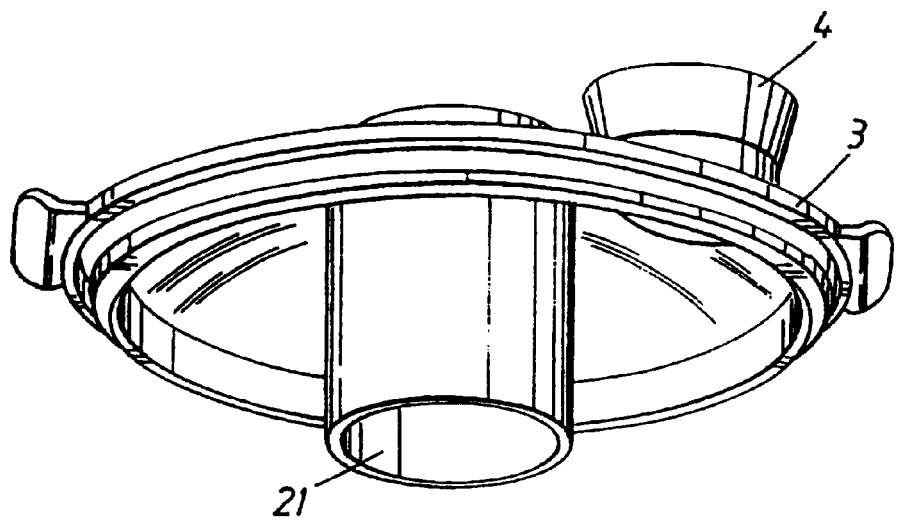

TURNING DEVICE FOR FOOD PROCESSING CUTTING MACHINES

BACKGROUND OF THE INVENTION

1. Field of the Invention

The present invention relates to a turning device for food processors of the kind in which the processor is designed as a cutting machine for cutting or chopping the raw foodstuffs to be processed.

2. Description of the Related Art

Machines of this kind are available in designs for use in industrial kitchens and also in designs for domestic use.

A common feature of these machines is that they include a container which is fitted with a lid that has an infeed opening which allows raw foodstuffs to be inserted into the container while the machine is in operation. A tubular member which accommodates a driven shaft extends up from the bottom of the container. A cutting device is non-rotatably fitted to the shaft. The cutting device includes a sleeve-like central part which runs on the outside of the upwardly projecting tubular member and which carries the cutting tool at its lower end. The cutting tool may consist in one or more knives that extend radially outwards from the sleeve. The container is held stationary while the cutting device rotates, when the machine is in use.

One problem with food processors of this kind is that certain types of ingredients to be processed by the knives tend to fasten to the outer surface of the central part, causing the mass of ingredients to rotate together with said central part.

An example of such agglomerated masses is found in different types of meat that are to be chopped with the aid of the knives. For instance, meat that is minced tends to form a ball that sticks firmly to the outer surface of the central part and to the inner surface of the container. Consequently, the ball will only rotate around a horizontal axis to a relatively small extent.

This poor rotation of the ball means that the meat will be unevenly chopped. The poor rotation of the meat about a horizontal axis also means the disadvantage that the knives will cut through meat that has already been chopped, causing a local increase in temperature in the meat, which is highly disadvantageous with respect to the quality of the food prepared.

The same problem occurs with other types of food masses that can form a more or less sticky ball, such as fish mince, dough, etc.

The present invention solves this problem.

SUMMARY OF THE INVENTION

The present invention thus relates to a turning device for food processors of the kind where the processor is a cutting machine for cutting or chopping raw foodstuffs to be processed. The machine includes a container that is fitted with a lid, said container being stationary during operation of the machine. A tubular member extends up from the container bottom, and a driven shaft extends through said tubular member. A cutting device is non-rotatably mounted on said shaft and includes a sleeve-like central part on the outside of the upwardly extending tubular member, and carries said cutting tool at its lower end. The cutting tool includes one or more knives that extend radially outwards from the sleeve. The turning device includes at least axially extending strips of the outer surface of a sleeve member whose inner diameter slightly exceeds the outer diameter of the central part. The strips extend at one end thereof from a common holder. The turning device is adapted to be fitted to the central part in its position of use, with the holder facing upwards. The extension of the turning device in the length extension of the central part is such as to cover essentially the whole of the central part above said knives. The holder is adapted to be supported by the lid or a device connected with said lid, in the position of use of said holder, such that the turning device will be stationary while the food processor is operating, or will be rotatable relative to said container only to a limited extent.

BRIEF DESCRIPTION OF THE DRAWINGS

The invention will now be described in more detail partly with reference to exemplifying embodiments thereof and also with reference to the accompanying drawings, in which

FIG. 3 illustrates a lid equipped with an inventive turning device;

FIG. 4 shows the lid of FIG. 3 placed on a container;

FIG. 5 is a perspective view o the lid shown in FIG. 3, taken obliquely from below; and FIG. 6 illustrates a second embodiment of an inventive turning device.

DESCRIPTION OF THE PREFERRED EMBODIMENTS

Figure 1:
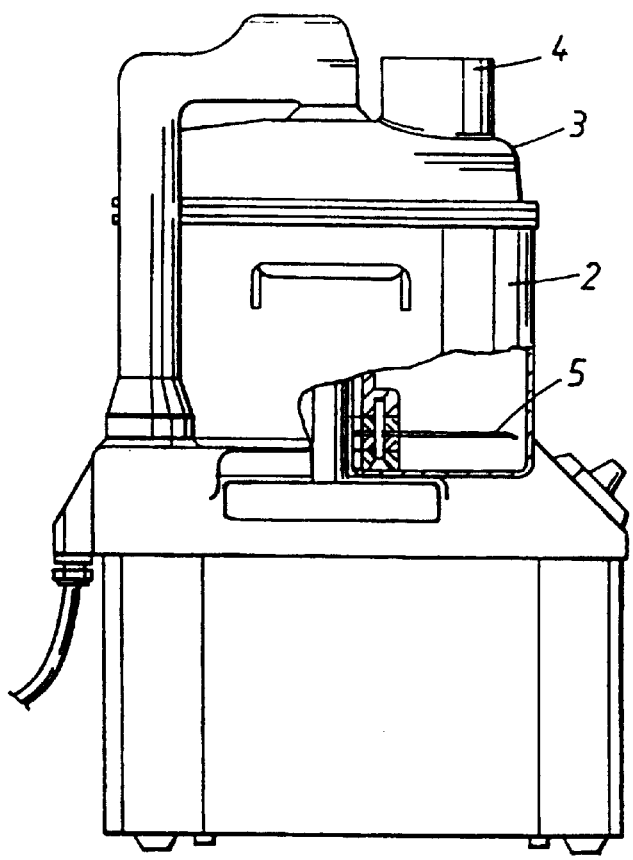
FIG. 1 is a partially cut-away view of a food processor of the kind with which the invention is utilized.

FIG. 1 illustrates a food processor in the form of a food cutting machine which cuts or chops raw foodstuffs that are to be processed. The cutting machine includes a container 2 which is provided with a lid 3 that has a food infeed opening 4 through which raw foodstuffs can be fed into the container while the machine is operating. The container 2 remains stationary while the machine is operating. A rotary cutting device 5 is mounted above the container bottom. The present invention is intended for application with this type of food processor.

Food processors of this kind include a tubular member 7 which extends up from the bottom 6 of the container 2 and through which a driven shaft 8 extends (see FIG. 4), said shaft 8 having non-rotatably fitted thereto a cutting device 9 which includes a sleeve-like central part 10 located on the outside of the upwardly extending tubular member 7, and which at its lower end carries the cutting tool in the form of one or more knives 11, 12 that extend radially outwards from the sleeve-like central part 10.

Figure 2:
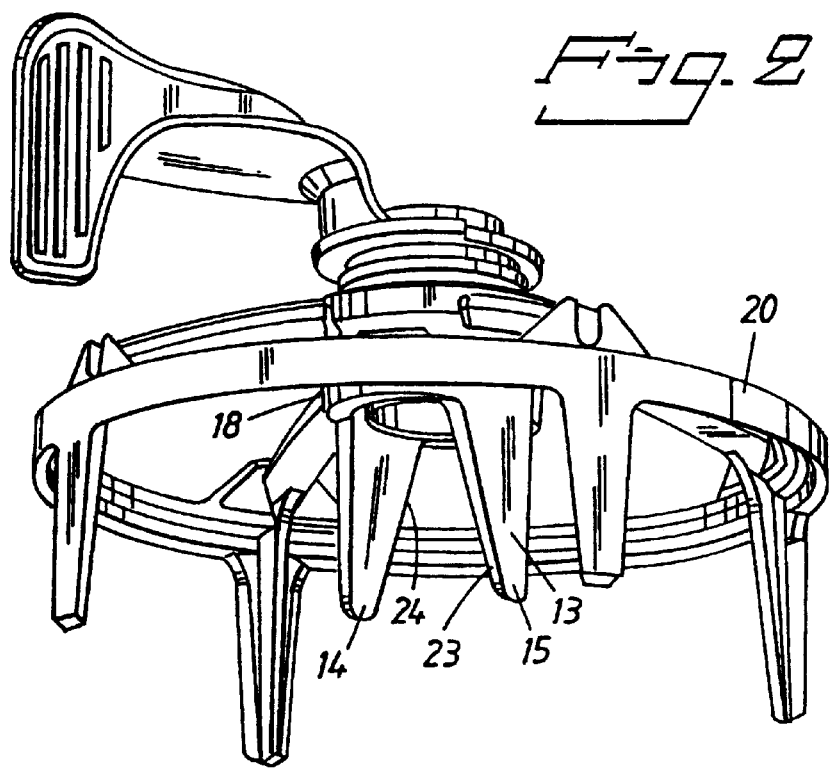
FIG. 2 illustrates a first embodiment of an inventive turning device.

According to the invention, as shown in FIGS. 2 and 4, the turning device 13 includes at least axially extending strips 14, 15 of the cylindrical surface of a sleeve member whose inner diameter slightly exceeds the outer diameter of the central part 10. As shown in FIG. 3, strips 14, 15 are held at one end 16, 17 thereof by a holder 18 which is common to said strips.

The turning device 13 is intended to be fitted onto the central part 10 with the holder 18 facing upwards, in the use position of said device.

The extension of the turning device 13 in the longitudinal direction of the central part is such that the device will cover essentially the whole of the central part 10 above the knives 11, 12. Further, the holder 18 is adapted to be carried by the lid 3, or by a device connected with said lid 3, when the holder is in its use position, such that said turning device 13 will be stationary, or will be rotatable relative to the container 2 only to a limited extent.

According to a first embodiment, the holder 18 is fastened to the lid 3 (see FIG. 3). The holder may either be an integral part of the lid 3, or may be detachably connected to the lid be means of a typical bayonet fitting (not shown) or with the aid of some other suitable fastener means.

According to a second embodiment of the invention, the holder 18 is connected to a scrape ring 20 which functions to scrape the vertical inner wall of the container. Such a scrape ring is described in Swedish Patent Specification No. 502 741. A scrape ring of this kind is supported by the upper edge of the container 2. The lid 3 can be fitted onto the scrape ring. Such a scrape ring, and therewith also the turning device, can rotate to a limited extent relative to the container.

A first preferred embodiment of the invention includes the strips as hereinbefore described and illustrated in FIGS. 2, 3, 4 and 5.

According to a second preferred embodiment of the invention, the surface of the sleeve member is imperforate, i.e. no slits are used to form said strips (see FIG. 6). In this case, the turning device is comprised of a sleeve member 21 which surrounds the central part 10. Similar to the earlier described embodiment, the sleeve member 21 may be an integral part of the lid or may be detachably fastened to the lid or carried by a device such as a scrape ring.

The basic function of the turning device is to prevent food mass in the food processor container from sticking to the central part 10 that rotates during operation of the processor. As a result of the presence of the turning device, which is stationary in relation to the container during operation of the processor, the food mass will tend to be rotated in the container solely by the action of the knives. It has been found that greater rotation of the food mass about a horizontal axis on the one hand and a vertical axis on the other is achieved in this way.

This increased rotary movement of the food mass causes said mass to be worked much more uniformly by the knives. Such rotation also prevents the knives from working in one and the same place in said mass, therewith avoiding local increases in temperature.

The embodiment that includes the aforesaid strips has a somewhat greater influence on the rotation obtained by constant impact of the food mass on the strips, as the food mass is driven forwards in the transporting direction of the knives.

The present invention thus solves the problem mentioned in the introduction.

The strips will preferably have a thickness of 2–10 millimeters.

With regard to the embodiment that includes strips 14, 15, it is preferred that the strips are from two to four in number.

It is also preferred that each strip 14, 15, in a plane perpendicular to the longitudinal axis 22 of the central part 10, extends around the central part 10 at an angle greater than 20°, taken in the rotational direction of the central part.

According to one preferred embodiment, the strips 14, 15 are bevelled such that the strip surfaces 23, 24 (see FIG. 2) that first meet the food mass as said mass is transported around the container by the knives will slope forwardly and downwardly in the transport direction. This contributes towards rotation of the food mass about a horizontal axis.

Although the invention has been described above with reference to a number of exemplifying embodiments thereof, it will be understood that the invention can be modified with respect to the design of the strips, the attachment of the holder, etc.

It will therefore be understood that the invention is not restricted to said exemplifying embodiments, and that modifications can be made within the scope of the following claims.

What is claimed is:

1. A turning device for food processors of the kind with which the processor is a cutting machine adapted to cut or chop raw foodstuffs to be processed, said cutting machine including a container fitted with a lid and being stationary during operation of the machine, a tubular member which extends up from the container bottom and through which a driven shaft extends, a cutting device which is non-rotatably mounted on the shaft and which includes a sleeve-like central part outside the upstanding tubular member, wherein the lower end of the sleeve-like central part carries said cutting tool in the form of one or more knives which extend radially out from the sleeve, said turning device comprising: at least one pair of axially extending, curved strips of a sleeve member that has an inner diameter that slightly exceeds an outer diameter of the central part of a rotatable cutting device; wherein one end of the respective strips extends out from a holder which is common to said strips; wherein the turning device is fitted to the central part in the position of use with said holder uppermost so that the turning device defines an extension in a longitudinal direction of the central part such as to overlie essentially the whole of the central part above the knives carried by the central part; wherein the holder is supported by the container lid in the use position of said turning device, such that the turning device is substantially stationary relative to the container during operation of the food processor.

2. A turning device according to claim 1, wherein the strips are from two to four in number.

3. A turning device according to claim 1, wherein the cylindrical surface of said sleeve member is imperforate and slit-free.

4. A turning device according to claim 1, wherein the strips have a thickness of from about 2 to about 10 millimeters.

5. A turning device according to claim 1, wherein each strip in a plane perpendicular to the longitudinal axis of the central part has an extension around the central part which corresponds to an angle greater than about 20° taken in the rotational direction of said central part.

6. A turning device according to claim 1, wherein the strips are bevelled so that a strip surface that is first met by food mass as said mass is transported around in the container by the knives slopes forwardly and downwardly in the mass transporting direction.

7. A turning device according to claim 1, wherein the holder is fastened in said container lid.

8. A turning device according to claim 1, wherein said holder is connected with a scrape ring for scraping a vertical inner wall of the container.

* * * * *